(12) United States Patent
Cherkasky

(10) Patent No.: US 9,297,303 B2
(45) Date of Patent: Mar. 29, 2016

(54) CONNECTING ROD FOR INTERNAL COMBUSTION ENGINE

(71) Applicant: Yakiv Cherkasky, Koblenz (DE)

(72) Inventor: Yakiv Cherkasky, Koblenz (DE)

( * ) Notice: Subject to any disclaimer, the term of this patent is extended or adjusted under 35 U.S.C. 154(b) by 0 days.

(21) Appl. No.: 14/297,951

(22) Filed: Jun. 6, 2014

(65) Prior Publication Data
US 2014/0360455 A1 Dec. 11, 2014

(51) Int. Cl.
*F02B 75/32* (2006.01)
*F16C 7/02* (2006.01)
*F16C 7/00* (2006.01)
*F02B 75/06* (2006.01)

(52) U.S. Cl.
CPC . *F02B 75/32* (2013.01); *F16C 7/00* (2013.01); *F16C 7/023* (2013.01); *F02B 75/06* (2013.01)

(58) Field of Classification Search
CPC .............. F16C 7/023; F16C 7/06; F16C 9/04; F16J 1/14; F16J 7/00
USPC ........................... 123/197.3; 74/579 E, 579 R
See application file for complete search history.

(56) References Cited

U.S. PATENT DOCUMENTS

| 5,870,979 A * | 2/1999 | Wittner | F02B 75/045 123/197.3 |
| 6,457,380 B1 * | 10/2002 | Aazizou | B60K 5/1241 74/579 E |
| 2004/0187837 A1 * | 9/2004 | Meyer | F02B 75/041 123/197.3 |
| 2008/0078353 A1 * | 4/2008 | Hayama | F16C 7/023 123/197.3 |

* cited by examiner

*Primary Examiner* — Marguerite McMahon
*Assistant Examiner* — James Kim
(74) *Attorney, Agent, or Firm* — Henry M. Feiereisen LLC.

(57) ABSTRACT

A connecting rod for internal combustion engines and the like has a rod, an upper connecting rod part, and a lower connecting rod part the rod is composed of at least two parts including a left part, as considered in direction of rotation of a crankshaft clockwise, having a straight shape and connected directly to the upper connecting rod part and to the lower connecting rod part, and a right preferably bent part connected directly to the lower connecting rod part and to the upper connecting rod part by an intermediate part.

5 Claims, 2 Drawing Sheets

CONNECTING ROD FOR INTERNAL COMBUSTION ENGINE

CROSS REFERENCE TO A RELATED APPLICATION

This application contains the subject matter of German patent application No. DE 10 2013 009 589.1 filed on Jun. 7, 2013, from which it claims priority in accordance with 37 USC 119(a)-(d).

BACKGROUND OF THE INVENTION

The invention relates to the field of mechanical engineering, in particular to internal combustion engines, and more particularly the connecting rods, which with the use of the redistribution of the mass provide realization of inner reserves for improving the economic and environmental parameters of the motors. This invention can be used in various motors regardless of the type of fuel, the diameter and position of the cylinders. The invention can be used for both motors in series production and development phase as well as for the motors which are already in use, as well as for compressors and other piston machines.

The invention proposes a simplified solution to the problems of both the traditional engines with the original designs as well as the engines after the modernization of the crank gear due to the use of the inertial forces of the weights to the right of the connecting rods with rotation of the crankshaft clockwise for the creation of the torque in the beginning of the working stroke and a supplementary torque during the full cycle of work of each cylinder.

"The highest pressure and accordingly the maximum force on the piston is in a cylinder during the beginning of the power stroke, that is, at the moment of the coming out from top dead center. The torque of this highest power, however, is zero in all of the traditional internal combustion engines, because the connecting rod and the crank of the crankshaft located at that moment are located on the single straight line, and therefore the vector of the force passes through the axis of rotation of the crankshaft. The torque approaches the nominal value only during turning the crankshaft by about 15-70 degree angle when the pressure in the cylinder is already 50-20%. These losses reduce the effective pressure" (Patent DE 10 2006 061 484 B3, paragraph 0007).

It is known that an internal combustion engine according to the patent DE 10 2006 061 484 B3, on the right side of the upper connecting rod head contains an additional part. Therefore, the center of gravity of the connecting rod is moved right. The inertial force of this section constitutes a supplementary torque on the crankshaft. It allows the maximum force exerted at the beginning of the working stroke, that is, at the outlet of the piston from the upper dead point, to be used for increasing the effective pressure. Therefore, the inertial force provides a bending moment on the connecting rod. It may cause the need for increasing the cross-sectional area and, consequently, an increase in the mass of the connecting rod. It increases the use of metal for the connecting rod and increases the dynamic resistance during the work of the engine, which reduces the effect of the supplementary action of the supplementary torque from the inertial forces.

Such disadvantage are also characteristic for the internal combustion engines according to German document DE 10 2009 003 900 B4, U.S. Pat. No. 8,156,918 B2 based on German document DE 10 2008 028 188 A1, and for the internal combustion engines according to the German documents DE 10 2010 051 825 A1, DE 20 2010 015 706.4, DE 10 2011 009 497 A1, DE 10 2011 108 947 A1, in which the attachment of a weight is provided on each connecting rod for the formation of the additional torque due to the action of the inertial forces on the crankshaft, with the disadvantage that this reserves causes an increase in the effective pressure.

The additional parts on each connecting rod increases the mass of the connecting rod, which increases the dynamic losses, and therefore reduces the efficiency of the engines. The generation of the inertial forces that are parallel to longitudinal tangential axis of the connecting rod with a point of engagement outside of the cross-section of the connecting rod, causes their longitudinal bending and therefore the increase of their inertia and resistance modules. Therefore, an excessive cross-sectional area of the connecting rod is provided, which causes an additional mass of the connecting rod. It also increases the additional dynamic resistance during the work of the engine.

The majority of the traditional constructions the connecting rod have in the connection of the connecting rod to the connecting rod foot a larger cross sectional area than in the connection with the upper connecting rod head (Alfred Urlaub "Internal combustion engines", Volume 3, Construction, Springer-Verlag Berlin Heidelberg N.Y. London Paris Hong Kong 1989, page 99, FIG. 4.1), in which the connecting rods absorb only the deformations of pressure and strain. Thus, this connecting rod in the lower section has the excess security and, consequently unreasonable metal use, as well as the increase of the dynamic resistance, taking into account the great accelerations of the piston with the connecting rod during its exit from the dead points, and during the following run of the working cycle.

SUMMARY OF THE INVENTION

Accordingly it is an object of the present invention to provide a connecting rod, with which as the result of the action of the inertia forces from the displacement of the center of gravity of the longitudinal axis of the connecting rod without increasing the mass of the connecting rod, the emergence of the torque is provided at the beginning of the power stroke and of an additional torque during the whole work cycle with a corresponding increase the effective pressure supplied to the internal combustion engines.

In keeping with these objects and with others which will become apparent hereinafter, one feature of the present invention resides in that the connecting rod comprises two parts, namely the left-hand part as considered during the rotation of the crankshaft in the clockwise direction a straight shape and is connected directly with the two connecting rod heads; the right part which is connected directly to the connecting rod foot, and it is connected with the upper head by an intermediate part. This intermediate part, in combination with the bent right part fulfills the function of the additional parts for the formation of the complementary torque, wherein the cross-sectional area at the connection of the rod with the connecting rod foot is equal to the cross-sectional area of the connection of the rod to the intermediate part right of the upper head; the outer line of the right and left parts of the connecting rod are equidistant relative to the cylinder running surface and the lower edge of the cylinder during rotation of the crankshaft; the connecting rod can have both cutouts on the end faces and a throughgoing opening between the right and left parts of the connecting rod.

The novel features of the present invention are set forth in particular in the appended claims. The invention itself, however, both as to its construction and its manner of operation, will be best understood from the description of the preferred embodiments, which are illustrated by the following drawings.

DESCRIPTION OF THE PREFERRED EMBODIMENTS

Figure 1:
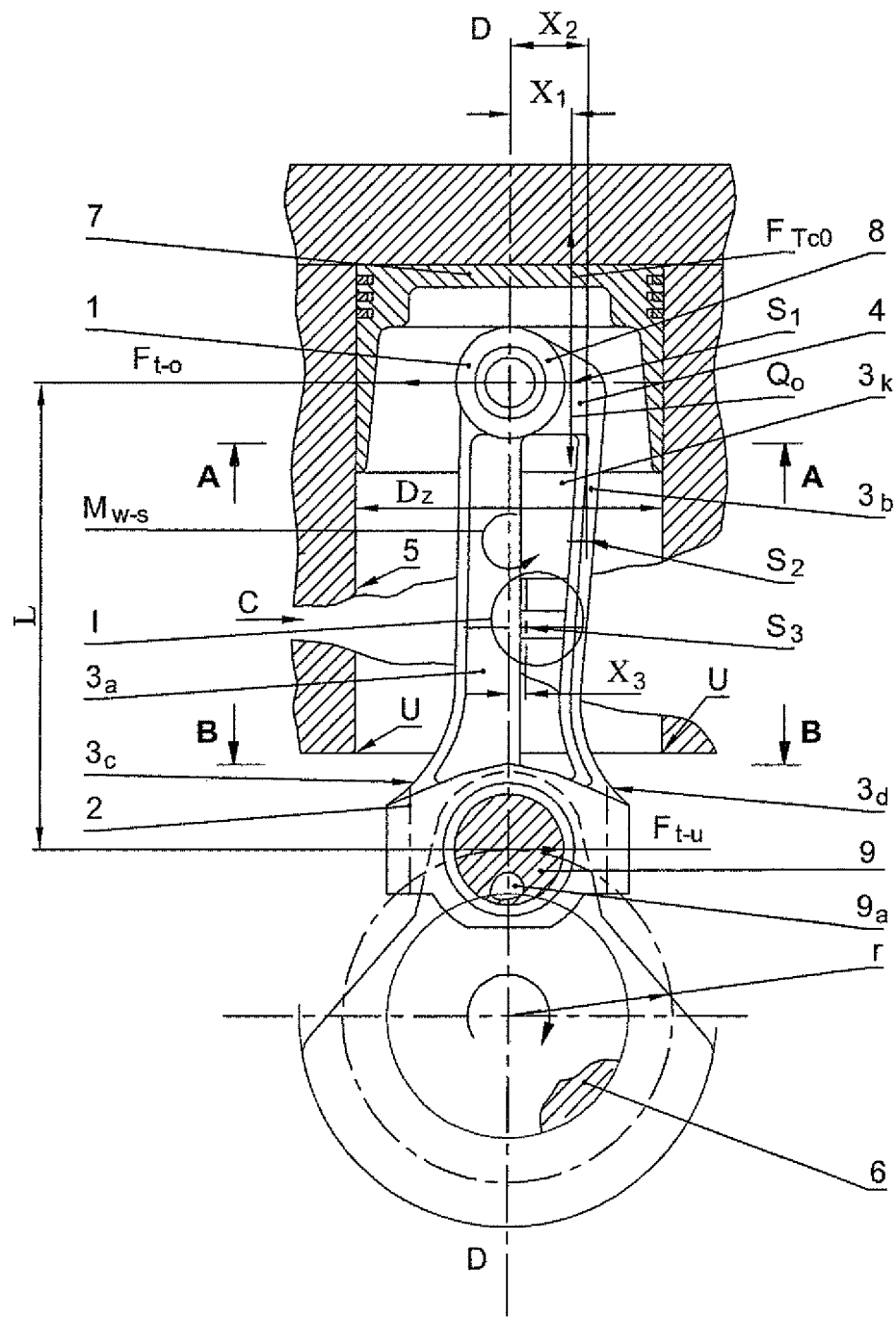
FIG. 1 is a view showing the connecting rod with the intermediate part in combination with the bent right part at the upper connecting rod head in combination in connection with the piston and the crank of the crankshaft, as well as the vectors of the inertial force and acceleration of the piston in the beginning of the stroke.
Figure 2:
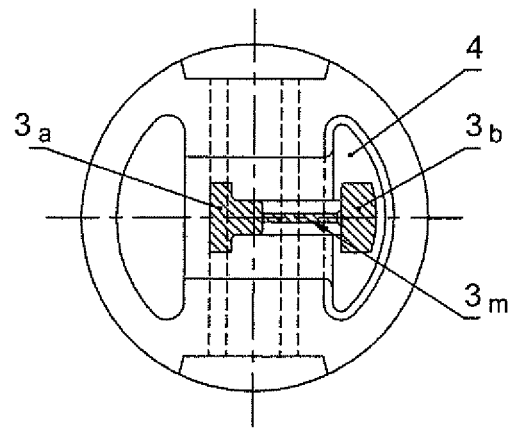
FIG. 2 is a view showing the cross-section AA of FIG. 1 with the cross-sections of the parts of the connecting rod and the view of the intermediate part.
Figure 3:
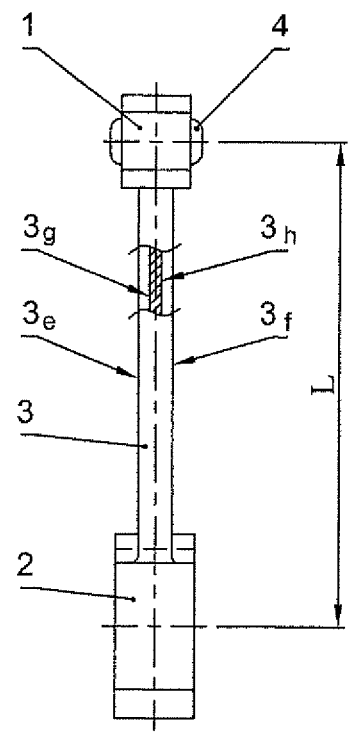
FIG. 3 is a view C of FIG. 1 showing the variant of the construction with the depressions on the connecting rod.

The connecting rod is composed of the upper connecting rod head (1) and connecting rod foot (2) connected with one another by means of the rod (3). The rod (3) is composed according to the invention of the left part (3a) and right part (3b). The left part (3a) has the shape which is preferably straight. The intermediate part (4) is located between the upper connecting rod head (1) and the right bent part (3b). The outer surfaces (3c) and (3d) are preferably equidistant with respect to the bottom edge (U) of the cylinder (5) during the rotation of the crankshaft (6).

The cross-sectional area as well as the inertia and resistance moments at the sections A-A and B-B of the connecting rod are the same. The rod (3) can be provided on both end faces (3e), (3f) with the cutouts (3g), (3h), and a through opening (3k) between the connecting rod head (1) and connecting rod foot (2) as well as between the parts (3a), (3b) and the intermediate part (4). The rib (3m) can be provided between the parts (3a), (3b). The connecting rod extends with its connections to the piston (7) through the piston pin (8) and by means of its contact with the crankpin (9) of the crank (9a) of the crankshaft (6) is placed in an engine. The cross-sections A-A and B-B are equally fixed. The excess mass of the material, which takes place in the traditional connecting rod, is transferred from the rod (3) with the connecting rod (2) to the intermediate part (4).

The action of the inertia forces from the intermediate portion (4) between the connecting rod head (1) and the bent right part (3b) can be in a typical internal combustion engine with real dimensions and parameters as seen in the following example:

Gasoline engine with the parameters:
Power=102 kW, maximum rotary speed=6100 1/min, maximum torque Mm=159 Nm;
l=157 mm–the length of the connecting rod;
x1=25 mm=0025 M–the distance between the own center of gravity (S1) of the intermediate part (4) and the connecting rod axis (DD).
x2=28 mm=0.028 m–the distance between the own center of gravity (S2) of the bent right part (3b) and the connecting rod axis (DD)
x3=6 mm=0.006 m–the distance between the center of gravity (S3) of the connecting rod according to the invention, and the connecting rod axis (DD). pl–0=0.7 kg–the mass of the typical traditional connecting rod and also the maximum mass of the connecting rod, after redistribution of the mass of the connecting rod according to this invention, i.e, the mass of the connecting rod, after redistribution of the mass pl–1≤0.

The dimensions of a typical connecting rod and calculations show that the provision of the same strength of the cross-sectional areas at the connections of the connecting rod (3) to the connecting rod head (1) and the connecting rod foot (2) of the above-mentioned typical connecting rod, can provide saving of the mass of the intermediate part mzd approximately 0.04 kg; mzd=0.04 kg.

The right turning part (3b), can have its mass mab=0.089 kg.

It is common knowledge that an inertial force FTr=–am, where a—acceleration, m—mass The sign "–" means that the vector of the inertial force has the direction which is opposite to the guide of the vector of acceleration.

According to the formula 13.8 from the book "Internal Combustion Engines"—Fundamentals, theory of operation, construction", by Dr. A. Urlaub-Springer-Verlag—1995, p. 366 acceleration of the piston $ak = r\omega^2 (\cos + \lambda \cos 2\phi)$, where r=0.043 m–the radius of the crank;
$\lambda = r/l = 0.043/0.157 = 0.275$;
$\omega$—angular velocity of the crankshaft;
$\phi$—angle of rotation, of the crankshaft.

The maximum rotational speed n=6100 1/min, $\omega = 2 \times \pi \times 6100/60 = 638.5$ rad/S.

At the beginning of the working stroke $\phi=0$ and the acceleration of the piston, together with the connecting rod is $a0 = r\omega^2 (1+\lambda) = 0.0405 \times 638.52 \times (1+0.275) = 21051.7$ m/S2 with their direction downwards.

The piston (7) moves during the stroke "Working stroke" from the top dead center downwardly with its acceleration by the action of the gas pressure. Along with it moves the connecting rod with the mass 0.7 kg and with this acceleration. When $\phi=0$, the parallel inertia forces are produced, that have upward direction:

from the intermediate part (4)–FTr.Zw.0=–MZD×a0=0.04×21051.7=842.1 N. This force forms on the connecting rod the turning moment MW–1=FTr.Zw.0×x1=842, 1×0.025=21 Nm;

from the right-turning part (3b)–FTr.Rt.0=maT×a0=0.089×21051.7=1874 N. This force forms on the connecting rod the turning moment MW 2=1874×0.028=52.5 Nm;

from the connecting rod–FTr.PI.0=mW–3×a0=0.7×21051.7=12631 N. This force seeks the connecting rod counter-clockwise with the turning moment MW–3=FTr.PI.0 x3=14736×0.006=88.4 Nm.

The sum of the turning moments MW–S=MW–1+MW–2+MW–3=21+52.5+88.4=162 Nm, which acts in the counter-clockwise direction.

The summary turning moment forms in each cylinder a couple of forces from the two tangential forces. The lower force Ft–u acts on the connecting rod journals and seeks the crankshaft to rotate clockwise. Ft–u=Ft–o=MW–S/1=162/0.157=1032 N. For $\phi=0$, the torque M0=Ft–u×r=1032×0.043=44.4 Nm is produced. Here, this torque Mo 44.4/159×100=28% of the maximum torque Mm.

The upper force (Ft–0) pushes the piston (7) to the cylinder (5). In this example, the cylinder (5) has its diameter Dz=85 mm=8.5 cm. The maximum gas pressure in the cylinder is p=60 bar. The force on the piston from the gases FG–K=60×π×8.52/4×9.81=33400 N. The friction force at the contact of the piston with the cylinder FR–K–Z=Ft–o×μ, where μ is friction coefficient. In the fluid friction μ is approximately 0.005. Therefore, the resistance to the movement, ie the loss of the friction force due to the effect of the inertia force in the kind of turning torque MW–S: FW–R=Ft–u×p=(FTr.ZW.0+FTr.Rt.0+FTr.Pl.0)×μ=(842.1+1874+12631)×0.005=77 N, which in comparison to the FG–K, the FW–r/FG–K× 100=77/33400×100=0.23%.

In the known engines modernized according to the above mentioned documents, the additional weights are attached right on the connecting rods and, as a result of this additional mass an additional inertial force with the upward direction is obtained. This force acts against the force from the pressure of gases. Therefore, the effect of the action of the inertial forces on the connecting rods and the effective pressure are reduced. For example, with the mass of the weight mG=0.08 kg, the inertial force FG=mG×a0=0.08×21051.7=1684 N. The loss is FG/FG–K×100%=842/33400×100=5%. The summary profit is 28%+5%=33%. Here, the corresponding saving of material and action of working force for mass production and assembly of the weights are provided.

Figure 4:
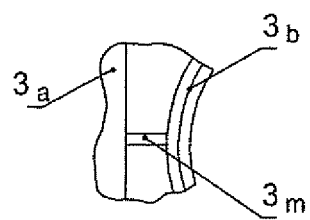
FIG. 4 is a view showing a variant of the connection between the parts of the connecting rod.

If ϕ=180 the acceleration of the piston is a180=rω2 (λ1)= 0.043×638.5 2×(1−0.275)=12709.5 m/S2 with the upward direction. The torque is M180=26.8 Nm, which rotates the crankshaft (6) in the clockwise direction. With ϕ=74.6 and 275.4, the angle between the connecting rod (3) and the crank (6) is equal to 90. According to the calculations and torsion moment plane (from the FIG. 4, 8 of the first cited document), the torques M74, 6 and M275, 4 are equal to 0. The directions of the vectors of the acceleration change to the opposite. These changes occur in the torque fluently.

In contrast to the traditional internal combustion engines, a torque on the crankshaft (6) is formed during the output of the piston (7) from the top dead center and the bottom dead center and in the whole working cycle. In the modernized engines according to the above cited documents also a supplement torque is produced. In contrast to these publications, this torque is produced according to this invention not from supplemental weight right on the connecting rod, but by the redistribution of mass of the material of the connecting rod without increasing the total mass of the connecting rod (2). This redistribution can, as a result of the realization of the Inner reserves, increase the effective pressure and achieve the economic and ecological effects.

The balance of the torques in the top and bottom dead centers of the piston, due to the effect of the inertial forces, eliminating the impact loads in the parts of the crank gear and the transmission. This allows to increase the safety of these parts and their connections, among others in the case of significant increase in torque at crankshaft. This makes possible the effective cross-sections of the parts and consequently their masses to reduce, and correspondingly to increase the effective pressure. The non-uniformity of rotation of the crankshaft is reduced, which also increases the effective pressure. In addition, the possibility arises to reduce the vibration of the masses. The eliminating of the impact loads in the crank mechanism reduces noise level and provides other above-mentioned advantages which have been confirmed experimentally.

The connecting rod in accordance with the present invention provides the following advantages:

The fuel consumption and correspondingly the quantity of the exhaust are reduced.

The acceleration and the pulling force are increased due to the increase in the effective pressure.

The ease of the operation of the engine is increased.

The ecological characteristics of the internal combustion engine and other piston engines are improved.

The possibility is provided for local modernization by means of the above-mentioned replacement of the connecting rod in the engines that are in use.

This technical solution is suitable for the compressors and other reciprocating machines.

The change in the construction of the connecting rod allows with the help of local modernization of various engines to obtain the above-mentioned advantages on the existing technological lines, without any post-reconstruction.

The present invention is not limited to the details shown since various modifications and structural changes are possible without departing from the spirit of the invention.

What is desired to be protected by Letters Patent is set forth in particular in the appended claims.

The invention claimed is:

1. A connecting rod for internal combustion engines and the like, comprising a rod (3), an upper connecting rod part (1), a lower connecting rod part (2), wherein the rod (3) is composed of at least two parts including a left part (3a), as considered in direction of rotation of a crankshaft (6) clockwise direction, having a straight shape and connected directly to the upper connecting rod part (1) and to the lower connecting rod part (2), a right part (3b) which is connected directly to the lower connecting rod part (2) and to the upper connecting rod part (1) by an intermediate part (4) providing an excess mass of a material only in the right part (3b) and which the right part (3b) is bent.

2. The connecting rod according to claim 1, wherein the intermediate part (4) is constructed in combination with the bend right part (3b) with a possibility of functioning as an additional unit for formation of an additional torque on the crankshaft (6), due to an effect of inertial forces due to a shift of a center of gravity of the connecting rod to the right.

3. The connecting rod according to claim 1, wherein the rod (3) at connections with the lower connecting rod part (2) and with the upper connecting rod part(1) due to the transmission of an excessive mass of a material of the rod (3) to the intermediate part (4) has identical cross-sections (AA) and (BB).

4. The connecting rod according to claim 1, wherein exterior lines of the right and left parts of the rod (3) during rotation of the crankshaft (6) are equidistant with respect to cylinder surface and a lower edge (U) of the cylinder.

5. The connecting rod according to claim 1, wherein the rod (3) has depressions (3g) and 3(h) provided on its end faces (3e) and (3f) and a throughgoing opening provided in a rib (3m) between the left part (3a) and the right part (3b).

\* \* \* \* \*